United States Patent
Kori et al.

(10) Patent No.: US 7,962,666 B2
(45) Date of Patent: Jun. 14, 2011

(54) TRANSFER APPARATUS, TRANSFER SYSTEM, PROGRAM, AND TRANSFER METHOD

(75) Inventors: Takayuki Kori, Kanagawa (JP); Yasuharu Seki, Tokyo (JP); Rui Yamada, Kanagawa (JP); Tatsuya Konno, Tokyo (JP)

(73) Assignee: Sony Corporation, Tokyo (JP)

( * ) Notice: Subject to any disclaimer, the term of this patent is extended or adjusted under 35 U.S.C. 154(b) by 456 days.

(21) Appl. No.: 11/904,549

(22) Filed: Sep. 27, 2007

(65) Prior Publication Data

US 2008/0263240 A1 Oct. 23, 2008

(30) Foreign Application Priority Data

Oct. 2, 2006 (JP) .................................. 2006-271239

(51) Int. Cl.
*G06F 3/00* (2006.01)

(52) U.S. Cl. ......... 710/18; 710/4; 710/6; 710/7; 710/15; 710/17; 710/19; 710/20; 710/21; 710/33; 710/34; 710/52

(58) Field of Classification Search .................. 710/4, 6, 710/7, 15, 17, 18, 19, 20, 21, 33, 34, 52
See application file for complete search history.

(56) References Cited

U.S. PATENT DOCUMENTS

| | | | | |
|---|---|---|---|---|
| 7,305,442 | B1 * | 12/2007 | Lundy ........................... | 709/206 |
| 7,548,623 | B2 * | 6/2009 | Manabe ........................ | 380/283 |
| 7,694,049 | B2 * | 4/2010 | Goh et al. .................... | 710/107 |
| 2004/0210628 | A1 * | 10/2004 | Inkinen et al. ............... | 709/201 |
| 2005/0091397 | A1 * | 4/2005 | Roberts et al. ............... | 709/232 |
| 2005/0254456 | A1 * | 11/2005 | Sakai et al. ................... | 370/328 |
| 2006/0121846 | A1 * | 6/2006 | Mazar et al. ..................... | 455/7 |
| 2006/0136676 | A1 * | 6/2006 | Park et al. ..................... | 711/144 |
| 2006/0200690 | A1 * | 9/2006 | Cline et al. .................... | 713/320 |
| 2006/0233146 | A1 * | 10/2006 | Nagata et al. ................ | 370/342 |
| 2006/0276206 | A1 * | 12/2006 | Shiotsu et al. ............... | 455/462 |
| 2007/0033362 | A1 * | 2/2007 | Sinclair ........................ | 711/165 |

FOREIGN PATENT DOCUMENTS

JP 2001-175624 6/2001

* cited by examiner

*Primary Examiner* — Tariq Hafiz
*Assistant Examiner* — Jasjit S Vidwan
(74) *Attorney, Agent, or Firm* — Wolf, Greenfield & Sacks, P.C.

(57) ABSTRACT

A transfer apparatus includes a connection status detection block, a storage status detection block, a no-operation status detection block, and a transfer block. The transfer block can automatically transfer candidate data to a memory device when a connected status is detected by the connection status block, the transfer candidate stored status is detected by the storage status detection block, and a no-operation status is detected by the no-operation status detection block.

50 Claims, 10 Drawing Sheets

# TRANSFER APPARATUS, TRANSFER SYSTEM, PROGRAM, AND TRANSFER METHOD

CROSS REFERENCES TO RELATED APPLICATIONS

The present invention contains subject matter related to Japanese Patent Application JP 2006-271239 filed in the Japan Patent Office on Oct. 2, 2006, the entire contents of which being incorporated herein by reference.

BACKGROUND OF THE INVENTION

1. Field of the Invention

The present invention relates to a transfer apparatus, a transfer system, a program, and a transfer method.

2. Description of the Related Art

Recently, PCs (Personal Computers) and portable devices are capable of sharing content data, such as video and audio data, by transmitting and receiving these content data between PCs and portable devices.

To be more specific, a PC obtains content data transmitted from an external device or automatically downloaded therefrom on the basis of a RSS (Rich Site Summary) reader. Next, of the obtained content data, the PC decodes, as required, the content data that is a candidate to be transferred or transmitted to a portable device and transfers the decoded content data. Consequently, the content data obtained by the PC becomes available also in the portable device.

Japanese Patent Laid-open No. 2001-175624 discloses an automatic transfer method in which, when a PC is connected to a portable device, content data that is a candidate to be transferred to the portable device is automatically transferred thereto upon the acquisition of this content data by the PC. This automatic transfer method allows the automatic transfer of the content data obtained by a PC to a portable device without requiring any user operation of the PC.

SUMMARY OF THE INVENTION

However, in related-art technologies, the automatic transfer is started simply when content data that is a candidate of transfer is added to a PC, providing a trigger for the start. In addition, a load is imposed on the PC during the automatic transfer of content data. Consequently, if the automatic transfer of content data is started while the user of the PC is executing a job thereon, the user's job may be interrupted without user intention.

Therefore, the present invention addresses the above-identified and other problems associated with related-art methods and apparatuses and solves the addressed problems by providing a transfer apparatus, a transfer system, a program, and a transfer method that are configured, in a novel and improved manner, to automatically transfer content data without hindering the use of a transfer apparatus, such as a PC, by the user.

In carrying out the invention and according to one embodiment thereof, there is provided a transfer apparatus to which a memory device capable of storing content data may be connected. This transfer apparatus has a connection status detection block configured to detect a connected status in which the memory device and the transfer apparatus are interconnected; a storage status detection block configured to detect a transfer candidate stored status in which transfer candidate content data to be transferred to the memory device is stored in a storage media of the transfer apparatus; a no-operation status detection block configured to detect a no-operation status in which the transfer apparatus has not been operated by a user thereof for longer than a predetermined setting period of time; and a transfer block configured to automatically transfer the transfer candidate content data to the memory device when the connected status is detected by the connection status detection block, the transfer candidate stored status is detected by the storage status detection block, and the no-operation status is detected by the no-operation status detection block.

In carrying out the invention and according to another embodiment thereof, there is provided a transfer system. This transfer system is made up of a transfer apparatus; and a memory device capable of storing content data and being connected to the transfer apparatus. This transfer apparatus has a connection status detection block configured to detect a connected status in which the memory device and the transfer apparatus are interconnected; a storage status detection block configured to detect a transfer candidate stored status in which transfer candidate content data to be transferred to the memory device is stored in a storage media of the transfer apparatus; a no-operation status detection block configured to detect a no-operation status in which the transfer apparatus has not been operated by a user thereof for longer than a predetermined setting period of time; and a transfer block configured to automatically transfer the transfer candidate content data to the memory device when the connected status is detected by the connection status detection block, the transfer candidate stored status is detected by the storage status detection block, and the no-operation status is detected by the no-operation status detection block. The memory device has a receiver configured to receive content data automatically transferred from the transfer block and a storage configured to store the content data.

In carrying out the invention and according to still another embodiment thereof, there is provided a program configured to make a computer function as a transfer apparatus to which a memory device capable of storing content data may be connected. This transfer apparatus has a connection status detection block configured to detect a connected status in which the memory device and the transfer apparatus are interconnected; a storage status detection block configured to detect a transfer candidate stored status in which transfer candidate content data to be transferred to the memory device is stored in a storage media of the transfer apparatus; a no-operation status detection block configured to detect a no-operation status in which the transfer apparatus has not been operated by a user thereof for longer than a predetermined setting period of time; and a transfer block configured to automatically transfer the transfer candidate content data to the memory device when the connected status is detected by the connection status detection block, the transfer candidate stored status is detected by the storage status detection block, and the no-operation status is detected by the no-operation status detection block.

In carrying out the invention and according to yet another embodiment thereof, there is provided a program configured to make a computer function as a transfer system. The transfer system is made up of a transfer apparatus and a memory device capable of storing content data and being connected to the transfer apparatus. This transfer apparatus has a connection status detection block configured to detect a connected status in which the memory device and the transfer apparatus are interconnected; a storage status detection block configured to detect a transfer candidate stored status in which transfer candidate content data to be transferred to the memory device is stored in a storage media of the transfer apparatus; a no-operation status detection block configured to detect a no-operation status in which the transfer apparatus has not been operated by a user thereof for longer than a predetermined setting period of time; and a transfer block configured to automatically transfer the transfer candidate content data to the memory device when the connected status is detected by the connection status detection block, the transfer candidate stored status is detected by the storage status detection block, and the no-operation status is detected by the no-operation status detection block. This memory device has a receiver configured to receive content data automatically transferred from the transfer block and a storage configured to store the content data.

In carrying out the invention and according to a different embodiment thereof, there is provided a transfer method for a transfer apparatus to which a memory device capable of storing content data may be connected. This transfer method has the steps of detecting a connected status in which said memory device and said transfer apparatus are interconnected; detecting a transfer candidate stored status in which transfer candidate content data to be transferred to said memory device is stored in a storage media of said transfer apparatus; detecting a no-operation status in which said transfer apparatus has not been operated by a user thereof for longer than a predetermined setting period of time; and automatically transferring said transfer candidate content data to said memory device when said connected status is detected in the connection status detecting step, said transfer candidate stored status is detected in the storage status detecting step, and said no-operation status is detected in the no-operation status detecting step.

In carrying out the invention and according to a still different embodiment thereof, there is provided a transfer method for a memory device capable of storing content data and a transfer apparatus to which said memory device may be connected. This transfer method has detecting a connected status in which said memory device and said transfer apparatus are interconnected; detecting a transfer candidate stored status in which transfer candidate content data to be transferred to said memory device is stored in a storage media of said transfer apparatus; detecting a no-operation status in which said transfer apparatus has not been operated by a user thereof for longer than a predetermined setting period of time; automatically transferring said transfer candidate content data to said memory device when said connected status is detected in the connection status detecting step, said transfer candidate stored status is detected in the storage status detecting step, and said no-operation status is detected in the no-operation status detecting step; receiving said automatically transferred content data by said memory device; and storing said content data in said memory device.

As described and according to the invention, the novel configuration allows the automatic transfer of content data to the reproducing device without hindering the use of the transfer apparatus by the user.

DETAILED DESCRIPTION OF THE PREFERRED EMBODIMENTS

Figure 1:
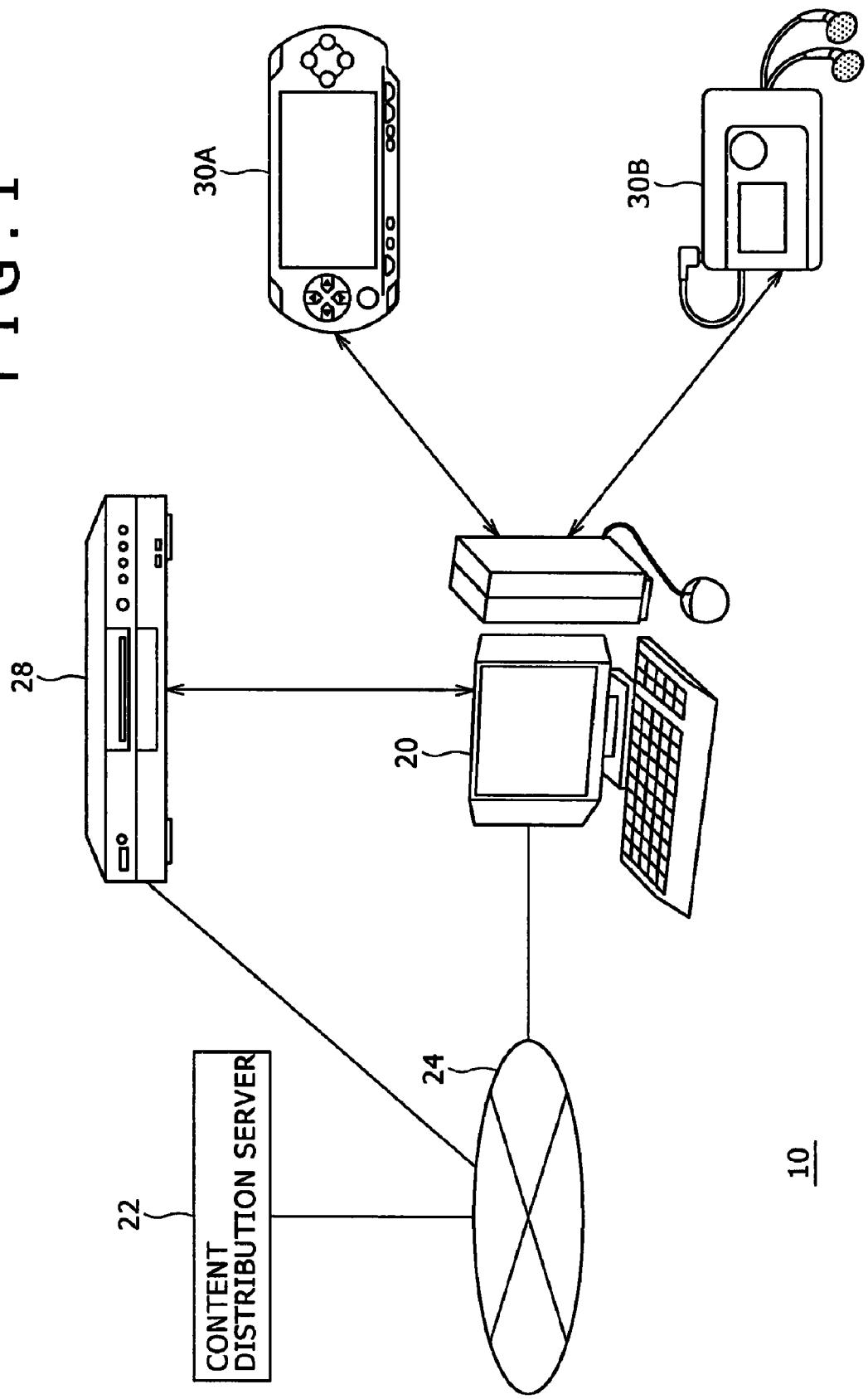
FIG. 1 is a schematic diagram illustrating an exemplary configuration of a data transfer system practiced as one embodiment of the invention.

This invention will be described in further detail by way of embodiments thereof with reference to the accompanying drawings. It should be noted that, for the brevity of description, throughout the present specification and drawings accompanying thereto, substantially the similar components are denoted by the same reference numerals.

First, referring to FIG. 1, an outline of a data transfer system 10 practiced as one embodiment of the invention will be described.

FIG. 1 shows a configuration of the data transfer system 10. The data transfer system 10 has a PC 20, a content distribution server 22, a network 24, a DVD (Digital Versatile Disc) recorder 28, and a reproducing device 30.

The PC 20 functions as a transfer apparatus that obtains content data from an external device, such as the content distribution server 22 or the DVD recorder 28, and transfers the obtained content data to the reproducing device 30. The PC 20 can preset desired content data on the content distribution server 22 to automatically download the preset content data from the content distribution server 22 when the preset content data is updated or newly registered.

Also, automatically or by way of a user operation, the PC 20 can obtain content data stored in the DVD recorder 28 connected to the PC 20 via a home network. It should be noted that the DVD recorder 28 is shown only as one of external storage devices, which include a PC, a home video processing device, a mobile phone, a PHS (Personal Handyphone System), a portable music player, a portable video processing device, a PDA (Personal Digital Assistant), a home game machine, a portable game machine, or household appliances, for example.

Further, the PC 20 can also obtain content data that is transferred from a recording media connected to the PC 20. Recording media include nonvolatile memories such as EEPROM (Electrically Erasable Programmable Read-Only Memory) and EPRPM (Erasable Programmable Read-Only Memory), magnetic disks such as hard disk and floppy disk (trademark), optical disks such as CD-R (Compact Disk Recordable)/RW (ReWritable), DVD-R (Digital Versatile Disk Recordable)/RW/+R/+RW/RAM (Random Access Memory), and BD (Blu-Ray Disc (trademark))-R/BD-RE, and MO (Magneto Optical) disk, for example.

The PC 20 according to the present embodiment can automatic transfer the content data obtained as described above to the reproducing device 30 if a predetermined transfer condition is satisfied, details of which will be described later.

The reproducing device 30 incorporates a storage block or a storage media configured to store content data. Alternatively, the reproducing device 30 may be a storage media. Also, the reproducing device 30 can store content data that is automatically transferred from the PC 20 into the storage block or the storage media. This configuration allows the automatic updating of the content data in the reproducing device 30 without user's operation of the PC 20. In addition, providing the above-mentioned predetermined condition allows the PC 20 to start the transfer of content data to the reproducing device 30 in an appropriate timed relation.

It should be noted that FIG. 1 shows a PlayStation Portable (trademark) for a reproducing device 30A and a portable video reproducing device for a reproducing device 30B, which are only examples of the reproducing device 30. For example, the reproducing device 30 may also be any of information processing devices, such as PC, home video processing device, PHS, portable music player, portable video processing device, PDA, home game machine, portable game machine, and household appliances, for example.

Likewise, referring to FIG. 1, the PC 20 is only illustrated for an example of a transfer apparatus; therefore, the PC 20 may be any one of information processing apparatuses that have a content data acquiring function and a content data transfer function.

The content data that is obtained by the PC 20 and transferred therefrom to the reproducing device 30 may be any data including music data such as music, talk, and radio programs, video data such as movies, television program, video program, photographs, paintings, and graphics, and others such as games and software.

Figure 2:
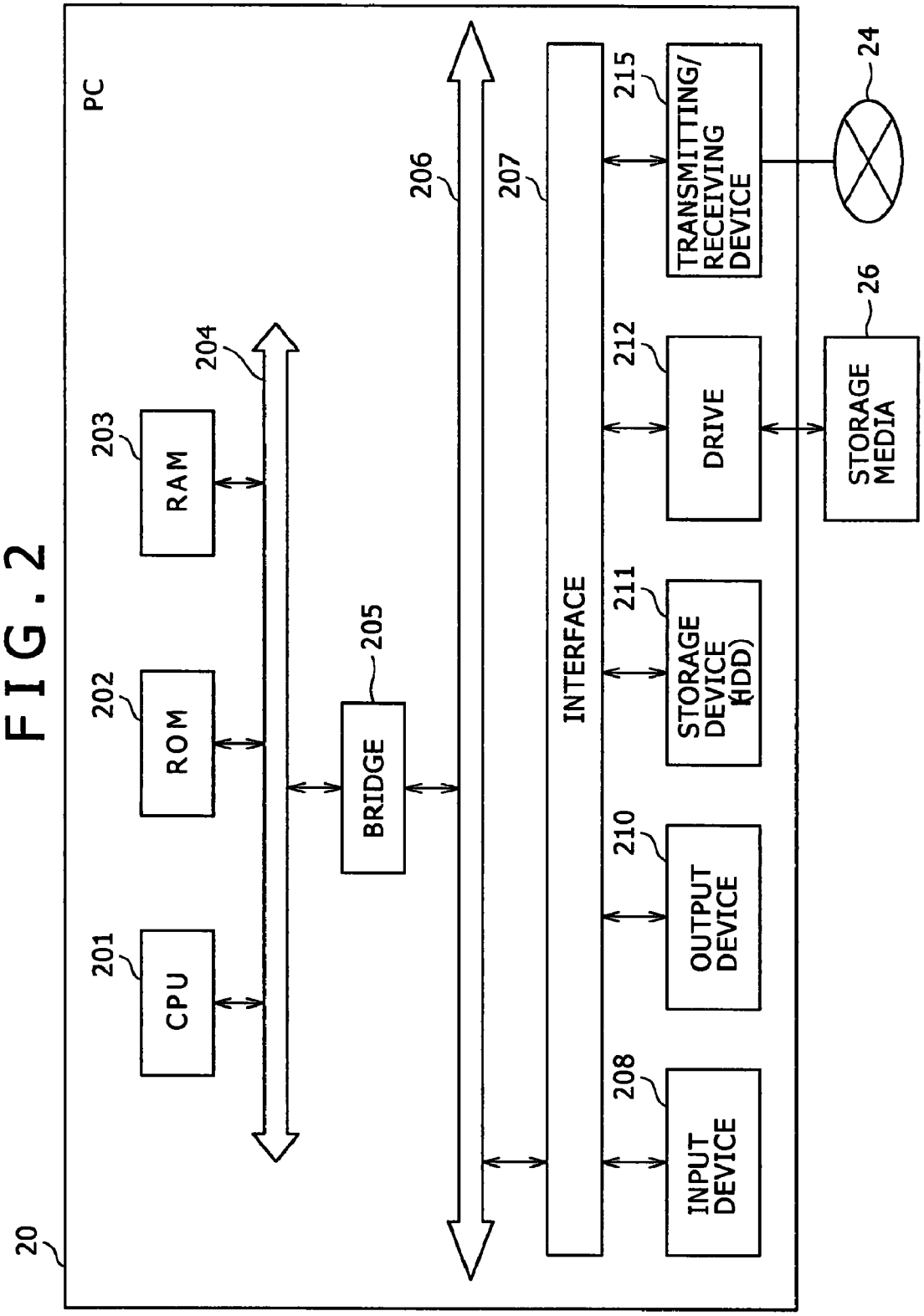
FIG. 2 is a block diagram illustrating an exemplary hardware configuration of a PC associated with the above-mentioned embodiment.

The following describes an exemplary hardware configuration of the PC 20 according to the present embodiment with reference to FIG. 2.

FIG. 2 shows an exemplary hardware configuration of the PC 20 according to the present embodiment. The PC 20 has a CPU (Central Processing Unit) 201, a ROM (Read Only Memory) 202, a RAM (Random Access Memory) 203, a host bus 204, a bridge 205, an external bus 206, an interface 207, and input device 208, an output device 210. a storage device (HDD) 211, a drive 212, and a transmitting/receiving device 215.

The CPU 201 functions as a computation processing device and a control device, thereby controlling the entire operations of the PC 20 as instructed by various programs. The ROM 202 stores programs and computation parameters that are used by the CPU 201 in the course of the processing executed thereby. The RAM 203 temporarily stores programs to be executed by the CPU 201 and parameters that change from time to time during the execution of programs. The CPU 201, the ROM 202, and the RAM 203 are interconnected by a host bus 204 configured by a CPU bus, for example.

The host bus 204 is connected to an external bus 206, such as a PCI (Peripheral Component Interconnect/Interface) bus via the bridge 205.

The input device 208 is made up of controls to be operated by the user, such as a mouse, a keyboard, a touch panel, buttons, switches, and levers, for example, and an input control circuit by which input signals are generated on the basis of user operations, the generated input signals being outputted to the CPU 201. Operating the input device 208, the user of the PC 20 can enter various data into the PC 20 and instruct the PC 20 to execute desired processing.

The output device 210 is made up of display devices, such as a CRT (Cathode Ray Tube) display monitor, an LCD (Liquid Crystal Display) monitor, and indicator lights, and audio output devices, such as a loudspeaker and a headphone, for example. The output device 210 outputs reproduced content data, for example. To be more specific, the display device various kinds of information, such as reproduced video data, in the form of texts or images. On the other hand, the audio output device converts reproduced audio data and so on into sound and outputs this sound.

The storage device 211 is a data storage device configured as one example of the storage device for the PC 20 according to the present embodiment and made up of a HDD (Hard Disk Drive), for example. The storage device 211 stores programs to drive the hard disk and executed by the CPU 201, various data, and externally obtained content data.

The drive 212 is a storage media reader/writer and built in the PC 20 or externally connected thereto. The drive 212 reads information from such the storage media 26 loaded thereon as a magnetic disk, an optical disk, a magneto-optical disk, or a semiconductor memory and transfers the read information to the RAM 203.

The transmitting/receiving device 215 is a communications interface based on a communications device configured for the connection to the network 24, for example. The transmitting/receiving device 215 obtains content data from the content distribution server 22 via the network 24, obtains content data from the DVD recorder 28 via a home network, and transfers content data to the connected reproducing device 30.

Figure 3:
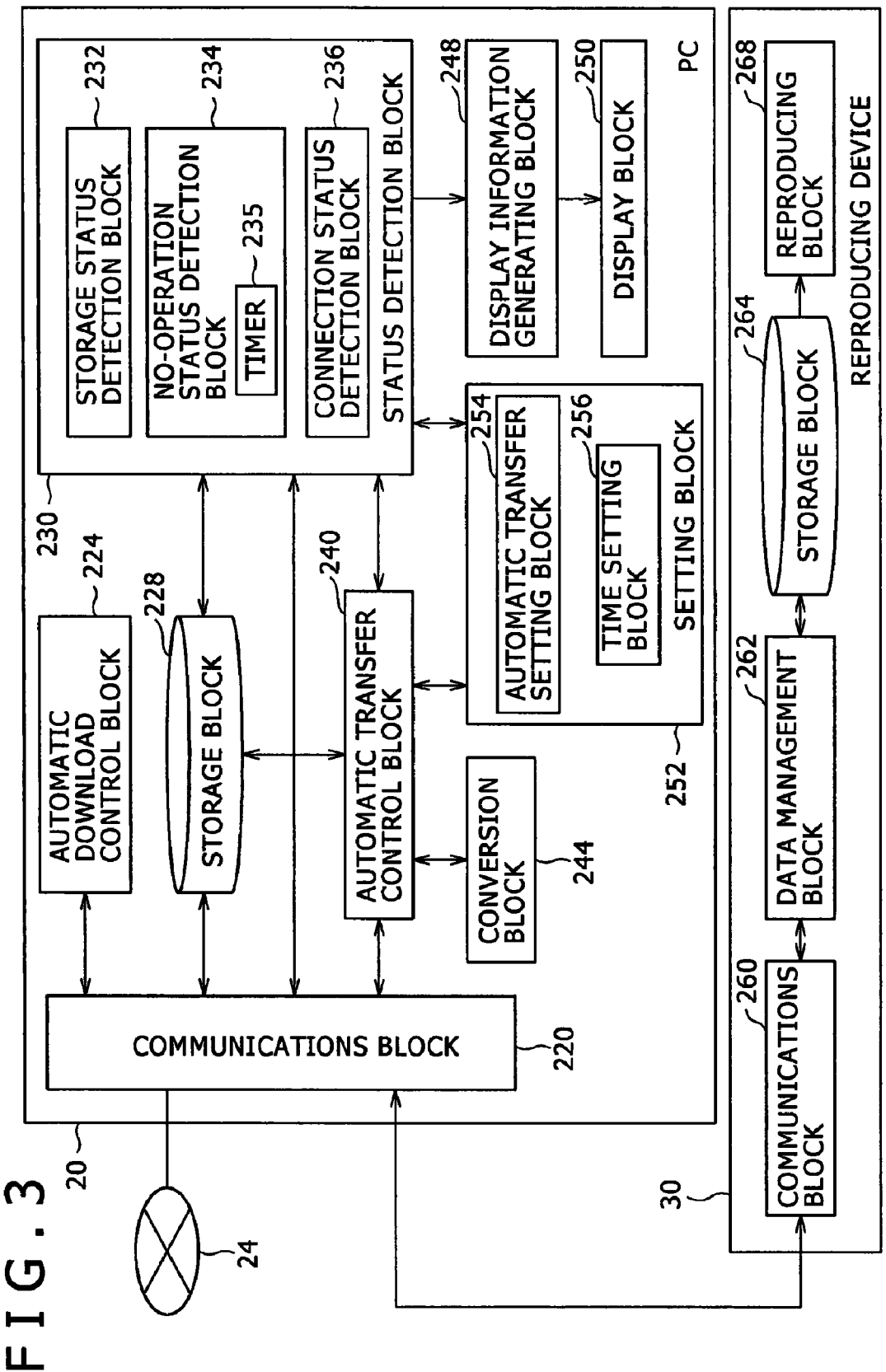
FIG. 3 is a block diagram illustrating an exemplary configuration of the PC associated with the above-mentioned embodiment.

The following describes a function of the PC 20 according to the present embodiment with reference to FIG. 3.

FIG. 3 is a block diagram illustrating configurations of the PC 20 and the reproducing device 30 according to the present embodiment. The PC 20 has a communications block 220, an automatic download control block 224, a storage block 228, a status detection block 230, an automatic transfer control block 240, a conversion block 244, a display information generating block 248, a display block 250, and a setting block 252. The reproducing device 30 has a communications block 260, a data management block 262, a storage block 264, and reproducing block 268.

The communications block 220 is an interface configured to execute transmitting and receiving various kinds of data with the content distribution server 22, an external storage device, or the reproducing device 30. The function of the communications block 220 may be realized by the transmitting/receiving device 215 shown in FIG. 2. These various kinds of data may include content data, a content data distribution request to the content distribution server 22, and RSS information written in RSS (Really Simple Syndication) that is a format for describing metadata such as Web site title and update information, for example. The communications block 220 may also be configured to execute wired data communication and wireless communication based on wireless USB or wireless LAN (Local Area Network).

The automatic download control block 224 executes control such that content data is automatically downloaded from the content distribution server 22 into the storage block 228 via communications block 220. For example, the automatic download control block 224 obtains the RSS information associated with the content data preset on the content distribution server 22 to determine whether the preset content data has been updated or newly registered. The automatic download control block 224 may also be configured to automatically transmit RSS information from the content distribution server 22 when the preset content data is updated or newly registered even if the RSS information of the content distribution server 22 is obtained regularly or at a predetermined frequency.

Then, if the automatic download control block 224 determines that the preset content data has been updated or newly registered on the basis of the obtained RSS information, the automatic download control block 224 can request the content distribution server 22 for this content data to download the content data.

The storage block 228, made up of a hard disk (the storage device shown in FIG. 2) or the above-mentioned storage media, for example, can store content data. Also, the storage block 228 can store additional information, such as the genre and size of content data, for example. In one example, the storage block 228 stores the content data automatically downloaded on the basis of control by the automatic download control block 224, the content data received from the DVD recorder 28 via a home network, and the content data obtained from a storage media.

The status detection block 230 has a storage status detection block 232, a no-operation status detection block 234, and a connection status detection block 236, thereby detecting various states associated with the PC 20.

The storage status detection block 232 determines whether the content data that is a candidate of transfer to the reproducing device 30 is stored in the storage block 228. If the content data that is a transfer candidate is found stored in the storage block 228, then the storage status detection block 232 detects a transfer candidate stored status.

The determination whether each piece of content data stored in the storage block 228 is a transfer candidate may also be made on the basis of a predetermined algorithm. For example, this algorithm may be that the content data not yet transferred to the reproducing device 30 is made a transfer candidate, the content data of which date of acquisition is later than a predetermined setting date is made a transfer candidate, or the content data of which rating information that is an objective evaluation of content data obtained via the network 24 is higher than a predetermined value is made a transfer candidate. It is also practicable to use a plurality of parameters (acquisition date, rating, and reproduction count, for example) in the execution of any of the above-mentioned algorithm.

The no-operation status detection block 234 determines whether a period of time in which no operation has been done on the input device 208 of the PC 20 has passed from a predetermined origin over a preset time. If the no-operation is found passed over a preset time, then the no-operation status detection block 234 detects a no-operation status.

For example, a keyboard operation or a mouse operation, for example, by the user on the PC 20 is a user operation. It should be noted that, if the OS (Operating System) is the Windows, for example, the above-mentioned keyboard operation or mouse operation may be detected by the no-operation status detection block 234 by entering a keyboard message or a mouse message through the Windows.

The above-mentioned predetermined origin is a start point of each no-operation period for determining the passing of a setting time. For example, this origin may be a point of time at which a last operation has been done by the user on the PC 20, a point time at which the storage status detection block 232 has detected a transfer candidate stored status, a point of time at which the connection status detection block 236 has detected a connected status, or a point of time at which a transfer candidate stored status and a connected status have been detected by the storage status detection block 232 and the connection status detection block 236 respectively.

Namely, the no-operation status detection block 234 can detect a no-operation status on the basis of whether a no-operation period of time has passed from a transfer candidate stored status detected by the storage status detection block 232 over a preset time, whether a no-operation period of time has passed from a connected status detected by the connection status detection block 236 over a preset time, or whether a no-operation period of time has passed from a transfer candidate stored status and a connected status detected by the storage status detection block 232 and the connection status detection block 236 respectively over a preset time.

It should be noted that, if the point of time at which a transfer candidate stored status has been detected by the storage status detection block 232 is used for the origin, then, when the user operates the PC 20 before the setting time has passed from this origin, the point of time at which the user has operated the PC 20 may be made a new origin. Likewise, if the point of time at which a connected status has been detected by the connection status detection block 236 is used for an origin, then, when the user operates the PC 20 before the setting time has passed from this origin, the point of time at which the user has operated the PC 20 may be made a new origin. Further, if a point of time at which the user has last operated the PC 20 is used for an origin, then, when the user operates the PC 20 before the setting time has passed from this origin, the operation of the PC 20 by this user becomes the last operation, thereby making this last operation point of time a new origin. In addition, the no-operation status detection block 234 may always execute the detection of no-operation status or start the detection of no-operation status from any one of the above-mentioned origins.

Also, the no-operation status detection block 234 can detect a no-operation status on the basis of timing information provided by a timer. For example, down-counting from a setting time of the timer 235 can be started from the above-mentioned origin to detect a no-operation status when the count value as the timing information of the timer 235 has reached "0". Alternatively, the no-operation status detection block 234 can start up-counting from the above-mentioned origin to detect a no-operation status when the count value has reached a setting time.

The no-operation status detection block 234 can also be configured to store a time that provides the above-mentioned origin to detect a no-operation status when the difference between the current time and the stored time has reached a setting time. The time that provides this origin may be stored in the storage block 228 or a storage media different therefrom. Further, if a user operation has not been done for a predetermined period of time, the no-operation status detection block 234 may detect a no-operation status when a screen saver for blackening the display or display a simple animation on a display device as one example of the output device 210 is started.

The connection status detection block 236 determines whether the reproducing device 30 is connected to the communications block 220. If the reproducing device 30 is found connected to the communications block 220, the connection status detection block 236 detects a connected status. The connection status detection block 236 may also be configured to detect a connected status by a notification from the OS or by monitoring a wired or wireless connection situation of the communications block 220. It should be noted that, in the case of wired connection, the connection of the reproducing device 30 to the communications block 220 may be detected as a connected status; in the wireless connection, the establishment of wireless connection between the communications block 220 and the reproducing device 30 may be detected as a connected status.

When each status detected by the status detection block 230 satisfies a transfer condition, the automatic transfer control block 240 automatically transfers content data stored in the storage block 228 to the reproducing device 30 via the communications block 220. Namely, in cooperation with the communications block 220, the automatic transfer control block 240 functions as a transfer block. For example, if the storage status detection block 232 has detected a transfer candidate stored status, the no-operation status detection block 234 has detected a no-operation status, and the connection status detection block 236 has detected a connected status, the automatic transfer control block 240 can automatically transfer the content data that is a transfer candidate stored in the storage block 228 to the reproducing device 30. It should be noted that, regardless of a sequence in which a transfer candidate stored status, a no-operation status, and a connected status are detected, the automatic transfer control block 240 can determine that a transfer condition is satisfied if these three statuses have been detected.

The above-described configuration allows the automatic transfer of content data from the PC 20 to the reproducing device 30 without hindering an operation by the user by means of the PC 20. Namely, the above-described novel configuration can prevent a problem involved in related-art technologies that the processing capacity of the CPU is lowered by the automatic transfer of content data, thereby hindering the use of the PC 20 by the user.

On the basis of an operation of the conversion block 244 that converts a data format of content data, the automatic transfer control block 240 can convert content data into a data format compliant with the reproducing device 30 as required and transfer the content data thus formatted. Available data formats include image compression formats such as JPEG (Joint Photographic Experts Group), MPEG1, MPEG 2 and MPEG4 and audio compression formats such as MP3 (MPEG1 Layer-3), AAC (Advanced Audio Codec), WMA9 (Windows Media Audio 9), ATRAC (Adaptive TRansform Acoustic Coding), and ATRAC3.

The display information generating block 248 generates information to be displayed on the display block 250 that is one example of the output device 210 described with reference to FIG. 2. For example, the display information generating block 248 generates display information as shown in FIG. 4.

Figure 4:
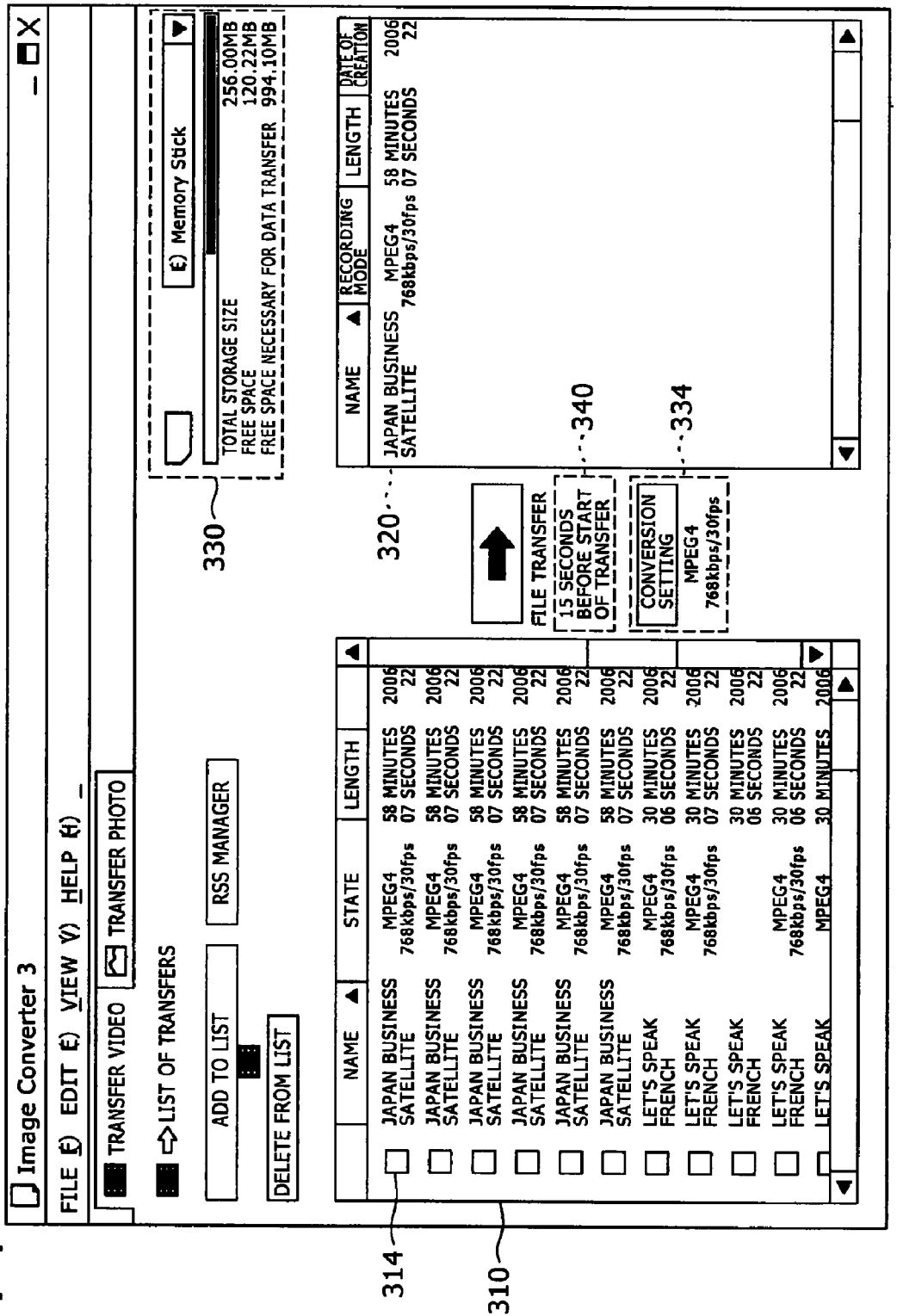
FIG. 4 shows an exemplary display information generated by a display information generating block.

FIG. 4 shows one example of display information generated by the display information generating block 248. The display information shown in FIG. 4 is the information for transferring content data. The transfer display information includes a transfer device content list 310, a reproducing device content list 320, a reproducing device storage situation 330, a conversion setting situation 334, and a count-down display 340.

The transfer device content list 310 is one example of the content data stored in the storage block 228 of the PC 20. In FIG. 4, each piece of content data stored in the storage block 228 is related with attribute information, such as name of content data, condition about data format of content data, length of content data, and date of content data creation. A check box 314 arranged to the left of the name of each piece of content data is checked by the user to select that content data for a candidate of transfer.

The reproducing device content list 320 is one example of the content data stored in a storage media of the reproducing device 30. With the reproducing device content list 320, each piece of content data stored in a storage media of the reproducing device 30 is also related with attribute information, such as name of content data, condition about data format of content data, length of content data, and date of content data creation.

The reproducing device storage situation 330 is indicative of a situation in which the content data stored in a storage media of the reproducing device 30 is stored. In the example shown in FIG. 4, the total storage size of the reproducing device 30 is 256.00 MB, the free space of the reproducing device 30 is 120.22 MB, and the free space necessary for data transfer, namely, the total size of the content data that is a candidate of transfer on the side of the PC 20 is 994.10 MB.

The conversion setting situation 334 is indicative in which data format the content data to be transferred from the PC 20 to the reproducing device 30 is converted before being transferred. In the example shown in FIG. 4, the content data is converted by the conversion block 244 into the MPEG format of 768 kbps/30 fps.

The count-down display 340 shows a timer value indicative of a time obtained by counting down from a setting time in the no-operation status detection block 234, for example. If this count down is executed by use of a point of time at which a transfer candidate stored status and a connected status are detected by the storage status detection block 232 and the connection status detection block 236 respectively as the origin, the count-down display 340 is indicative of a remaining time up to the start of the automatic transfer of content data by the automatic transfer control block 240 to the reproducing device 30. In the example shown in FIG. 4, the count-down display 340 is indicative of a remaining time until the automatic transfer of content data starts.

It should be noted that the count-down display 340 is only shown as an example of transfer start time display for identifying a remaining time until the start of the automatic transfer of content data. Therefore, a time after the setting time from a point of time at which the user has executed the last operation may be used as the transfer start time display or the value of timer on which count-up has started from a point of time at which the user has executed the last operation may be used as the transfer start time display.

The setting block 252 has an automatic transfer setting block 254 and a time setting block 256 and sets operations associated with the PC 20 as instructed by the user. The following describes functions of the setting block 252 with reference to FIG. 5.

Figure 5:
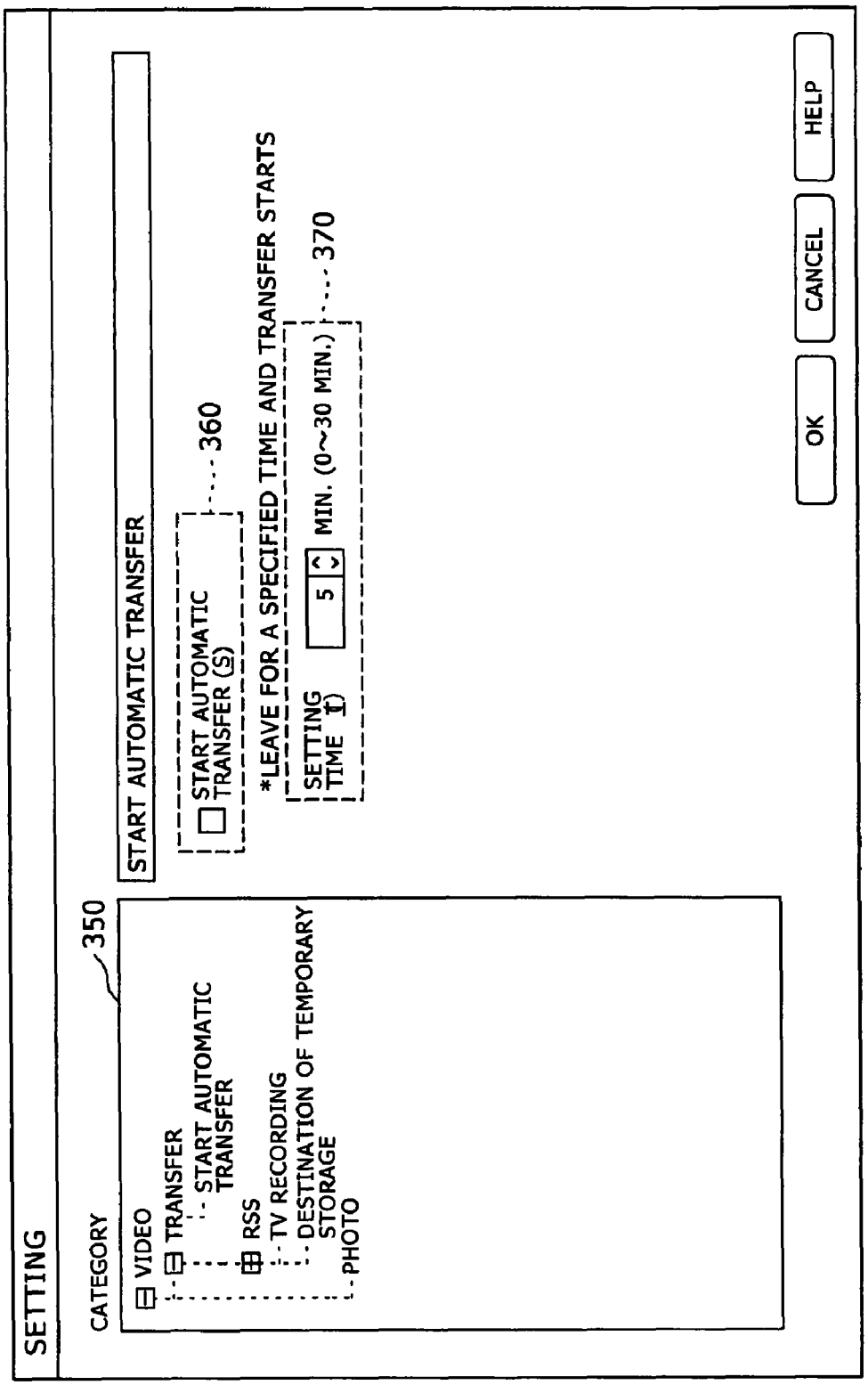
FIG. 5 shows exemplary time setting display information generated by the display information generating block.

FIG. 5 shows a time setting display screen generated by the display information generating block 248. This time setting display includes layer information 350, automatic transfer selection display 360, and setting time control display 370. The layer information 350 is information indicative of a layer structure of each screen shown on the PC 20.

The automatic transfer selection display 360 allows the user to select between the validation and invalidation of the automatic transfer function in the PC 20. If the automatic transfer function is validated by the user on the automatic transfer selection display 360, the automatic transfer setting block 254 sets the automatic transfer function valid.

The setting time control display 370 allows the user to adjust the setting time for use in the detection of a no-operation status by the no-operation status detection block 234. In the example shown in FIG. 5, the setting time is 5 minutes and this setting time is selectable between zero through 30 minutes. These values are illustrative only. The time setting block 256 sets a user-adjusted time.

Further, the time setting block 256 may be configured to set two or more different setting times in accordance with the attribute information of the content data that is a transfer candidate. The attribute information includes the genre, data format, length, and title of content data, for example. Therefore, the time setting block 256 can set shorter times for the content data of a genre in which the value is reduced with time, such as sports live coverage and live news, for example. On the other hand, the time setting block 256 can set longer times for the content data of a genre in which the necessity of quickly checking is relatively low, such as education programs and movies, for example. This novel configuration allows the PC 20 to automatically transfer the content data high in emergency to the reproducing device 30 earlier.

It should be noted that the CPU 201, the ROM 202, the RAM 203, and other hardware components shown in FIG. 2 can be made execute the functions substantially equivalent to the above-mentioned configuration on the basis of computer programs for making the computer execute the functions of the automatic download control block 224, the status detection block 230, the automatic transfer control block 240, conversion block 244, the display information generating block 248, and the setting block 252.

Referring to FIG. 3 again, the communications block 260 functions as a reception block for receiving content data automatically transferred from the PC 20. The data management block 262 manages the data to be stored or stored in the storage block 264. For example, the data management block 262 records content data received by the communications block 260 into the storage block 264 and deletes the content data received via the communications block 260 from the storage block 264 as specified by the user.

The storage block 264 stores content data managed by the data management block 262. Like the storage block 228 of the PC 20, the storage block 264 may be made up of nonvolatile memories such as EEPROM (Electrically Erasable Programmable Read-Only Memory) and EPRPM (Erasable Programmable Read-Only Memory), magnetic disks such as hard disk and floppy disk (trademark), optical disks such as CD-R (Compact Disk Recordable)/RW (ReWritable), DVD-R (Digital Versatile Disk Recordable)/RW/+R/+RW/RAM (Random Access Memory), and BD (Blu-Ray Disc (trademark))-R/BD-RE, and MO (Magneto Optical) disk, for example.

The reproducing block 268 can read content data from the storage block 264 and reproduce the read content data. The reproduction may include the processing of D/A converting content data if this content data is digital in format and transmitting the converted content data to an output device such as a display monitor or a loudspeaker or the processing of transmitting content data to an output device if this content data is analog in format.

The configuration of the data transfer system 10 is as described above. The following describes a method of transferring content data in the data transfer system according to the present embodiment with reference to FIGS. 6 through 10.

Figure 6:
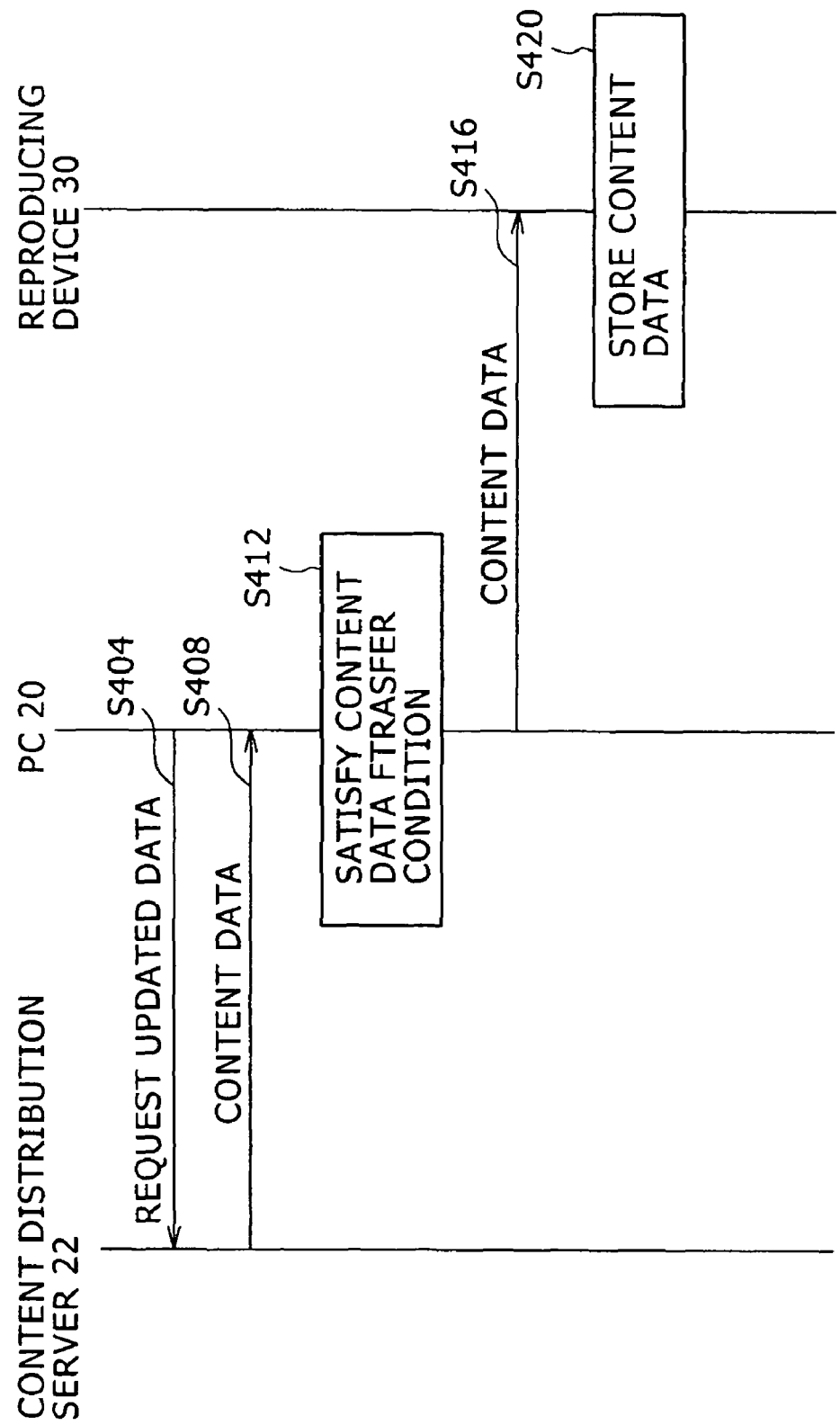
FIG. 6 is a sequence diagram illustrating the outline of an operation of a data transfer system associated with the above-mentioned embodiment.

FIG. 6 shows a sequence diagram indicative of an outline of operations of the data transfer system 10 according to the present embodiment. First, upon confirmation of the updating of the content data preset on the content distribution server 22, PC 20 requests the content distribution server 22 via the network 24 for the transmission of the updated content data (S404). Next, the PC 20 obtains the updated content data from the content distribution server 22 via the network 24 (S408).

Then, the PC 20 determines whether a content data transfer condition is satisfied or not (S412). To be more specific, if the storage status detection block 232 has detected a transfer candidate stored status, the no-operation status detection block 234 has detected a no-operation status, and the connection status detection block 236 has detected a connected status, the automatic transfer control block 240 determines that the transfer condition of content data is satisfied.

If the transfer condition is content data is found satisfied, the PC 20 transmits the content data that is a transfer candidate to the reproducing device 30 (S416). The reproducing device 30 can receive and store the content data thus transmitted from the PC 20 (S420).

Figure 7:
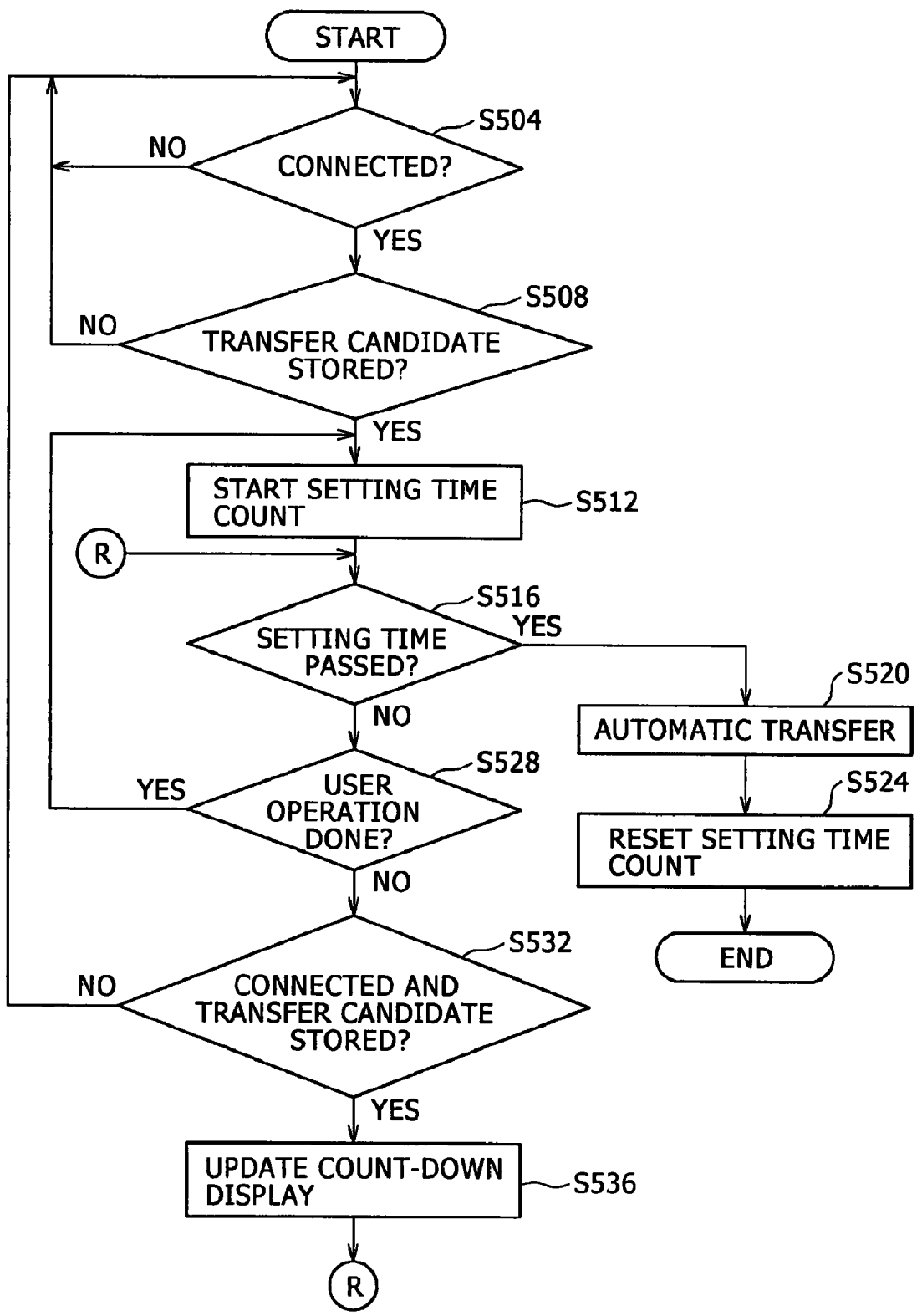
FIG. 7 is a flowchart indicative of an exemplary detail operation of the PC associated with the above-mentioned embodiment.

FIG. 7 is a flowchart indicative of one example of detail operations on the PC 20. First, the PC 20 determines whether a connected status has been detected by the connection status detection block 236 (S504). If a connected status is found not detected by the connection status detection block 236, the PC 20 repeats the processing of step S504. On the other hand, if the connected status is found detected, then the PC 20 determines whether a transfer candidate stored status has been detected by the storage status detection block 232 (S508).

If the transfer candidate stored status is found not detected by the storage status detection block 232 in step S508, the PC 20 returns to step S504. On the other hand, if the transfer candidate stored status is found detected, the no-operation status detection block 234 starts the count-down of the setting time with the determined point of time used as the origin (S512).

Then, the no-operation status detection block 234 determines whether the setting time has passed or not on the basis of whether the count-down value has reached "0" or not (S516). If the setting time is found passed by the no-operation status detection block 234, then the automatic transfer control block 240 starts automatic transfer of the transfer candidate content data (S520). Next, the no-operation status detection block 234 resets the count value (S524).

On the Other Hand, if the Setting Time is Found not passed by the no-operation status detection block 234 in step S516, the no-operation status detection block 234 determines whether another user operation has been done or not (S528). If another user operation is found done by the no-operation status detection block 234, the PC 20 returns to the processing of step S512. Namely, the no-operation status detection block 234 newly starts the count-down of the setting time (S512).

If another user operation is found not done, then the no-operation status detection block 234 determines whether a connected status or a transfer candidate stored status has been detected or not (S532). If a connected status or a transfer candidate stored status is found not detected, the PC 20 returns to the processing of step S504. On the other hand, if a connected status or a transfer candidate stored status is found detected by the no-operation status detection block 234, then the PC 20 updates the display of count-down and returns to the processing of step S516 (S536).

As described above, in the operational example of the PC 20, the no-operation status detection block 234 detects a no-operation status on the basis of whether the setting time has passed without any user operation of the PC 20 since the detection of a connected status by the connection status detection block 236 and a transfer candidate stored status has been detected by the storage status detection block 232. Therefore, even if the user has not operated the PC 20 longer than the setting time before the detection of a transfer candidate stored status of a connected status, any no-operation status is detected.

Namely, the no-operation status detection block 234 starts the detection of a no-operation status with the detection of both transfer candidate stored status and connected status used as a trigger. If the reproducing device 30 is connected to the PC 20, the possibility that the user is located by the PC 20 and the possibility that the user starts operating the PC 20 are high. If the time at which the transfer candidate content data is automatically downloaded to the PC 20 is known by the user, it is possible that the user wants the confirmation of that content data on the PC 20 immediately after that transfer candidate content data has been stored in the PC 20.

Therefore, configuring the PC 20 into the above-mentioned operational example allows to prevent the automatic transfer by the automatic transfer control block 240 when the user checks the content data just automatically downloaded and when the user starts operating the PC 20.

Figure 8:
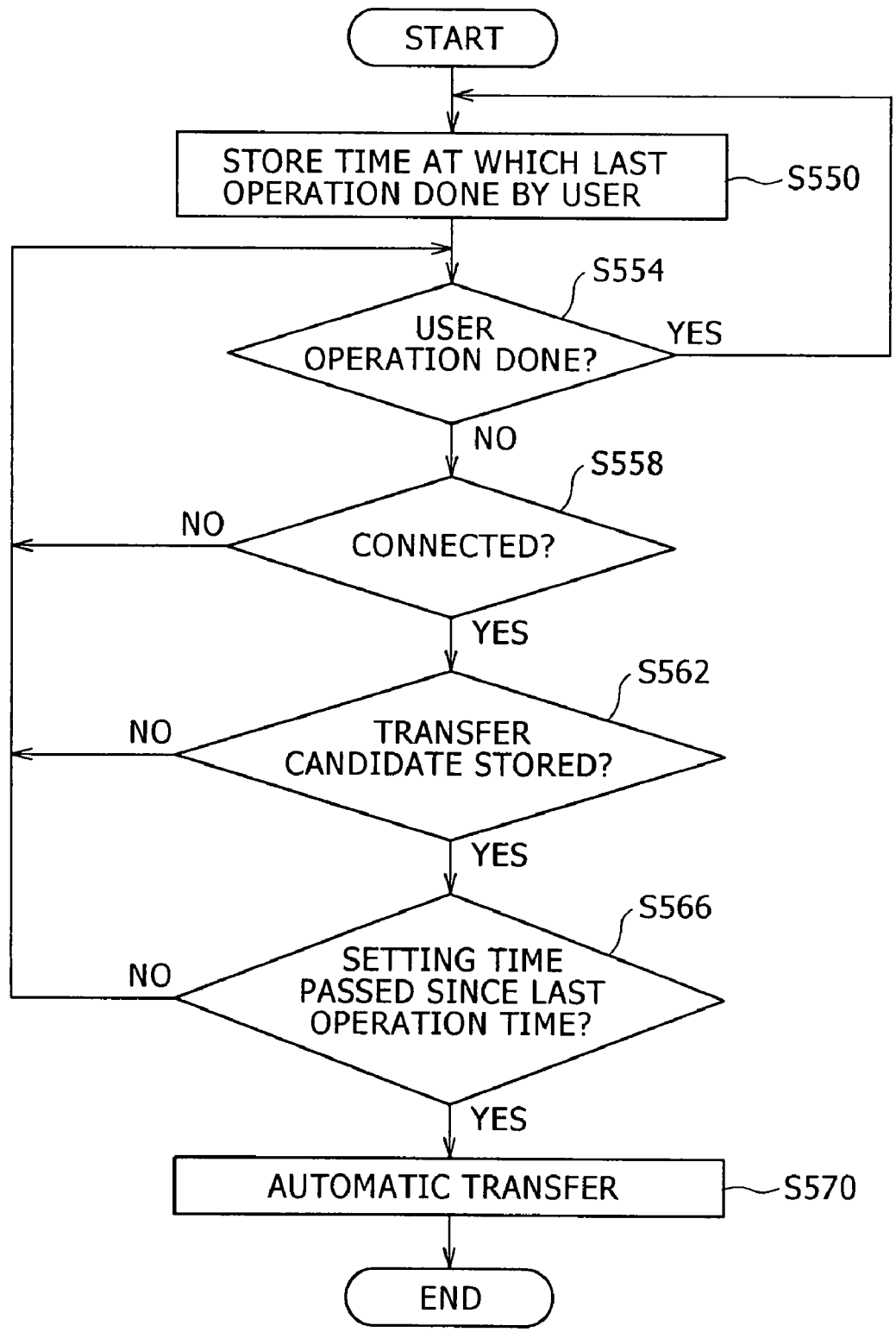
FIG. 8 is a flowchart indicative of another exemplary detail operation of the PC associated with the above-mentioned embodiment.

FIG. 8 is a flowchart indicative of another example of detail operations of the PC 20. In the operational example shown in FIG. 8, first the no-operation status detection block 234 of the PC 20 stores a time at which the user has operated the PC 20 into the storage block 228 as an origin time (S550).

Next, the no-operation status detection block 234 determines whether the user has operated the PC 20 (S554). If a user operation is found done by the no-operation status detection block 234, the PC 20 returns to the processing of step S550. On the other hand, if a user operation is found not done, the automatic transfer control block 240 determines whether a connected status has been detected or not (S558).

If a connection status is found not detected in step S558, then the PC 20 returns the processing of step S554. On the other hand, if a connected status is found detected, the automatic transfer control block 240 determines whether a transfer candidate stored status is detected or not (S562). If a transfer candidate stored status is found not detected, the PC 20 returns to the processing of step S554. On the other hand, if a transfer candidate stored status is found detected, the no-operation status detection block 234 determines whether the setting time has passed since the time at which the last operation was done by the user (S566).

If the Setting Time is Found not Passed Since the user's last operation time in step S566, then the PC 20 returns to the processing of step S554. On the other hand, if the setting time is found passed, then the automatic transfer control block 240 starts the automatic transfer of the transfer candidate content data (S570).

As described above, in the above-mentioned operational example of the PC 20, the no-operation status detection block 234 can detect a no-operation status on the basis of whether the setting time has passed since the time at which user executed the last operation. Therefore, if a connected status and a transfer candidate stored status have been detected before the detection of a no-operation status, the automatic transfer control block 240 can start the automatic transfer upon detection of a no-operation status. If a connected status and/or a transfer candidate stored status is detected after the detection of a no-operation status, the automatic transfer control block 240 can start the automatic transfer upon the detection of both a connected status and a transfer candidate stored status.

Figure 9:
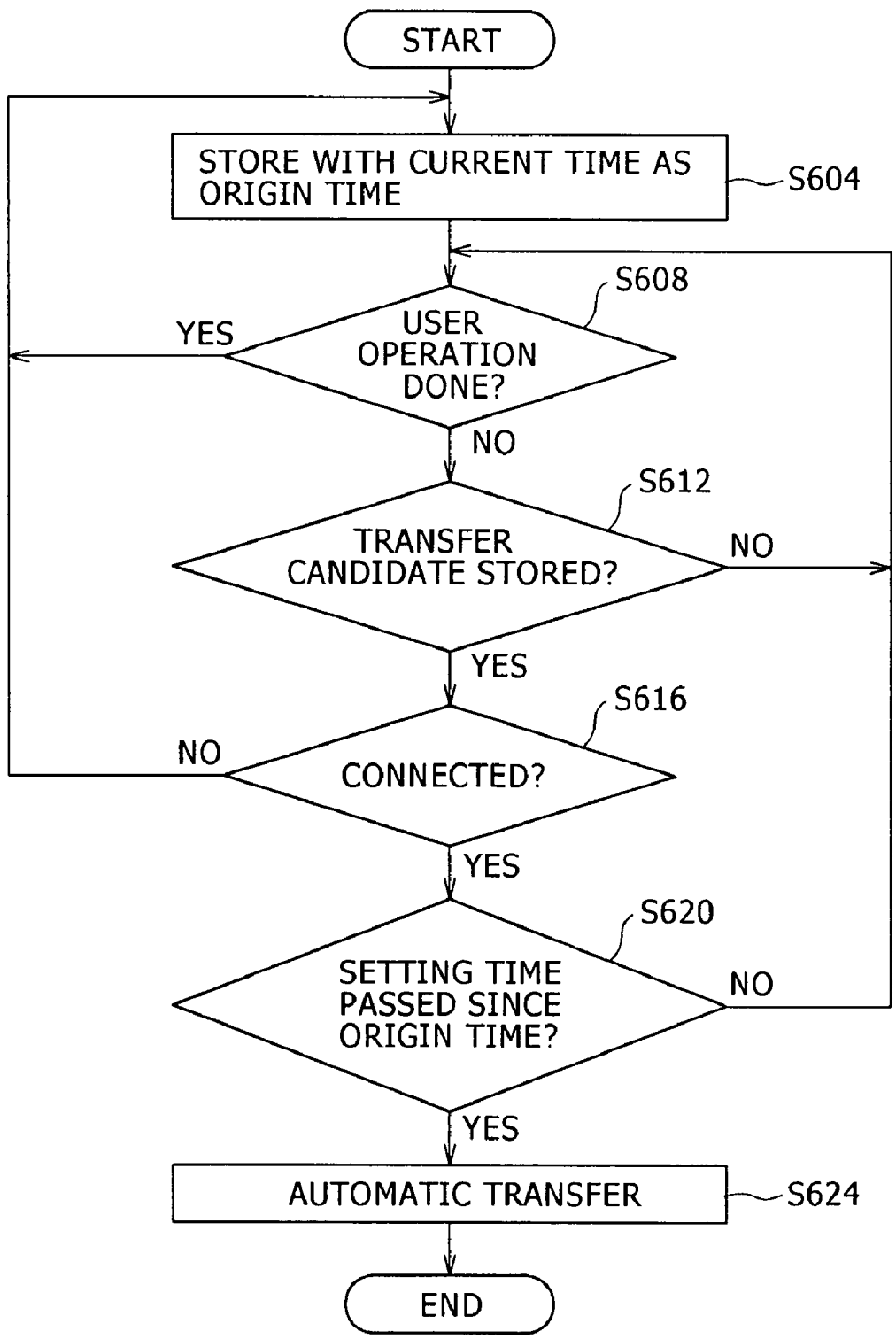
FIG. 9 is a flowchart indicative of still another exemplary detail operation of the PC associated with the above-mentioned embodiment.

FIG. 9 is a flowchart indicative of still another example of detail operations of the PC 20. In the operational example shown in FIG. 9, first the no-operation status detection block 234 stores the a current time into the storage block 228 as an origin time (S604).

Next, the no-operation status detection block 234 determines whether the user has operated the PC 20 (S608). If a user operation is found done by the no-operation status detection block 234, the PC 20 returns to the processing of S604 to newly store an origin time. On the other hand, if a user operations is found not done, the automatic transfer control block 240 determines whether a transfer candidate stored status has been detected or not (S612). If a transfer candidate stored status is found not detected by the automatic transfer control block 240, then the PC 20 returns the processing of step S608. If a transfer candidate stored status is found detected, the automatic transfer control block 240 further determines whether a connected status has been detected or not (S616). It should be noted that the detection of a transfer candidate stored status or a connected status may be determined by the no-operation status detection block 234.

If a connected status is found not detected in step S616, then the PC 20 returns to the processing of step S604. On the other hand, if a connected status is found detected, the no-operation status detection block 234 determines whether the setting time has passed since the origin time (S620). If the setting time is found not passed, then the PC 20 returns to the processing of step S608. On the other hand, if the setting time is found passed, the automatic transfer control block 240 starts the automatic transfer of the transfer candidate (S624).

Thus, in the above-mentioned operational example of the PC 20, the no-operation status detection block 234 detects a no-operation status on the basis of whether the setting time has passed since the detection of a connected status by the connection status detection block 236 without user's operation of the PC 20. In this configuration, a no-operation status is not detected even if the PC 20 has not been operated by the user for longer than the setting time before the detection of a connected status.

Namely, the no-operation status detection block 234 starts the substantial detection of a no-operation status with the detection of a connected status used as a trigger. Now, if the reproducing device 30 is connected to the PC 20, the possibility that the user is located by the PC 20 and the possibility that the user starts operating the PC 20 are high. Therefore, by using the point of time at which the connection status detection block 236 has detected a connected status as an origin, the no-operation status detection block 234 can prevent the automatic transfer by the automatic transfer control block 240 when the user starts operating the PC 20.

Figure 10:
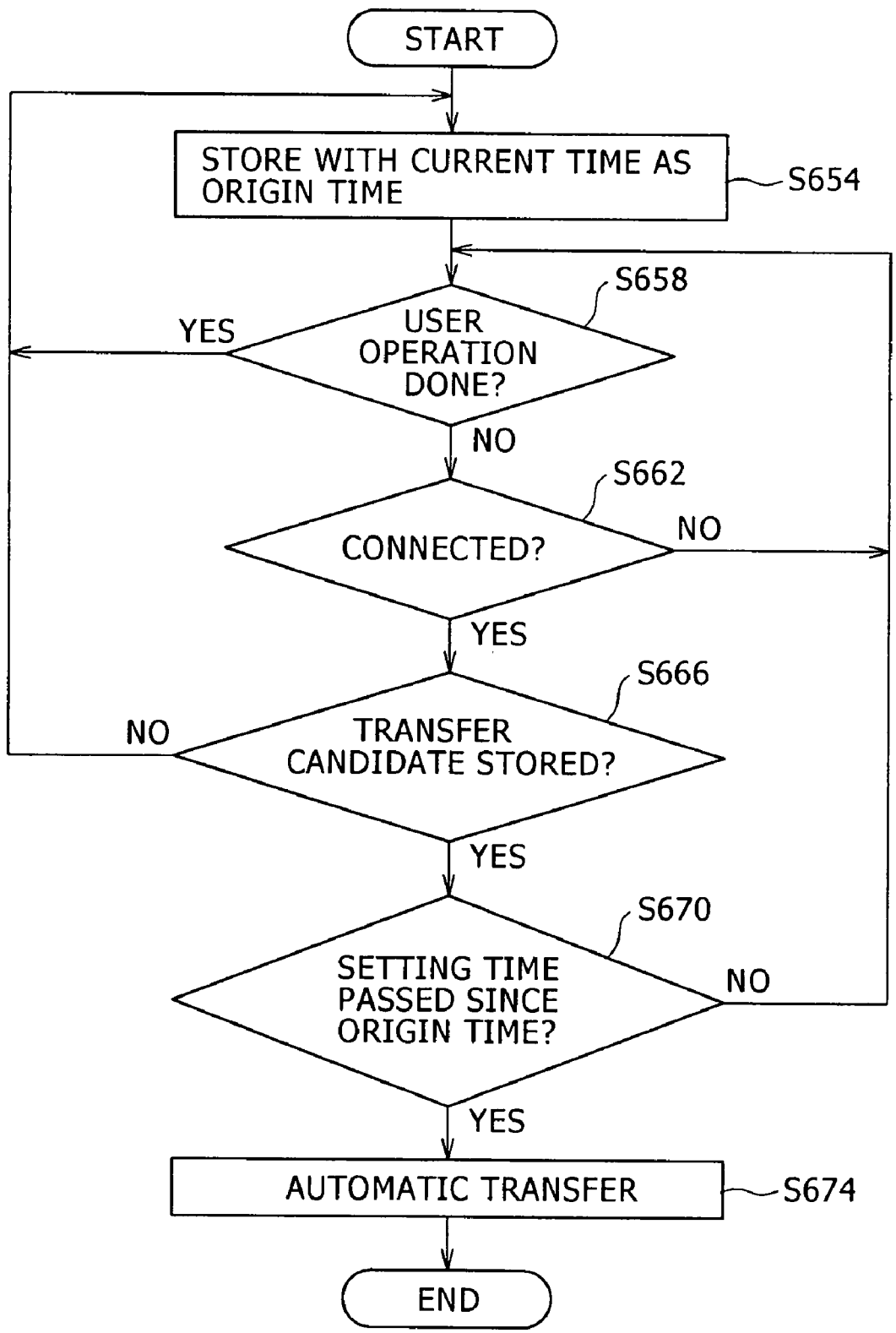
FIG. 10 is a flowchart indicative of yet another exemplary detail operation of the PC associated with the above-mentioned embodiment.

FIG. 10 is a flowchart indicative of yet another example of detail operations of the PC 20. In the operational example shown in FIG. 10, first the no-operation status detection block 234 stores a current time into the storage block 228 as an origin time (S654).

Next, the no-operation status detection block 234 determines whether the user has operated the PC 20 (S658). If a user operation is found done by the no-operation status detection block 234, then the PC 20 returns to the processing of step S654 to newly store an origin time. On the other hand, if a user operation is found not done, the automatic transfer control block 240 determines whether a connected status has been detected or not (S662). If a connected status is found not detected by the automatic transfer control block 240, then the PC 20 returns to the processing of step S658. If a connected status found detected, the automatic transfer control block 240 further determines whether a transfer candidate stored status has been detected or not (S666). It should be noted that the determination of the detection of a transfer candidate stored status or a connected status may be made by the no-operation status detection block 234. If new content data is added to the storage block 228 in step S666, the PC 20 may return to the processing of step S654.

If a transfer candidate stored status is found not detected in step S666, the PC 20 returns to the processing of step S654. On the other hand, if a transfer candidate stored status is found detected in step S666, then the no-operation status detection block 234 determines whether the setting time has passed since the origin time or not (S670). If the setting time is found not passed, the PC 20 returns to the processing of step S658. On the other hand, if the setting time is found passed, the automatic transfer control block 240 starts the automatic transfer of the transfer candidate (S674).

As described above, in the above-mentioned operational example of the PC 20, the no-operation status detection block 234 detects a no-operation status on the basis of whether the setting time has passed without user's operation of the PC 20 since the point of time at which the storage status detection block 232 detected a transfer candidate stored status. In this configuration, a no-operation status is not detected even if the user has not operated the PC 20 for longer than the setting time before the detection of a transfer candidate stored status.

Namely, the no-operation status detection block 234 starts the substantial detection of a no-operation status with the detection of a transfer candidate stored status used as a trigger. If the time at which transfer candidate content data is automatically downloaded to the PC 20 is known by the user, it is possible for the user to want the confirmation of the transfer candidate content data on the PC 20 immediately after the storage of that transfer candidate content data into the PC 20. Therefore, by using the point of time at which the storage status detection block 232 has detected a transfer candidate stored status as an origin, the no-operation status detection block 234 can prevent the automatic transfer by the automatic transfer control block 240 when the user wants to confirm the content data just automatically downloaded.

As described above, if connected to the reproducing device 30 and storing candidate content data to be transferred to the reproducing device 30, the PC 20 according to the present embodiment does not start the transfer of transfer candidate content data to the reproducing device 30 unless the period of time in which the user has not operated the PC 20 for longer than a preset time. Therefore, the above-described configuration can prevent a problem that, although the PC 20 is being used or operated, the PC 20 starts transferring the content data that is a transfer candidate to the reproducing device 30. Consequently, the PC 20 can automatically transfer transfer candidate content data to the reproducing device 30 without hindering the use or operation of the PC 20 by the user.

It is also practicable to configure the no-operation status detection block 234 so as to detect a no-operation status on the basis of whether the setting time has passed from the point of time at which the user executed the last operation. This configuration allows, if the PC 20 gets new content data and a transfer candidate stored status is detected with the PC 20 left unoperated for long because the user has been sleeping for example, the starting of automatic transfer to the connected reproducing device 30 upon the detection of the transfer candidate stored status. As a result, the PC 20 is in the status in which transfer candidate content data has been transferred to the reproducing device 30 when the user gets out of bed.

It is also practicable to configure the no-operation status detection block 234 so as to detect a no-operation status on the basis of whether the no-operation period of time has passed over the setting time since a point of time at which the connection status detection block 236 detected a connected status. If the reproducing device 30 is connected to the PC 20, it is highly possible for the user to be located by the PC 20 or start operating the PC 20. Therefore, the no-operation status detection block 234 can detect a no-operation status on the basis of whether a no-operation status has passed over the setting time since the detection of a connected status, thereby preventing the automatic transfer by the automatic transfer control block 240 when the user starts operating the PC 20.

It is also practicable to configure the no-operation status detection block 234 so as to detect a no-operation status detection block 234 can detect a no-operation status on the basis of whether a no-operation period of time has passed over the setting time since the detection of a transfer candidate stored status by the storage status detection block 232. If the time at which transfer candidate content data is automatically downloaded to the PC 20 is known by the user, it is possible for the user to want the confirmation of the transfer candidate content data immediately after that transfer content has been stored in the PC 20. Therefore, the no-operation status detection block 234 can detect a no-operation status on the basis of whether a no-operation period of time has passed over the setting time since the detection of a transfer candidate stored status, thereby preventing the automatic transfer by the automatic transfer control block 240 when the user wants the confirmation of the content data immediately after the automatic downloading thereof.

While preferred embodiments of the present invention have been described using specific terms, such description is for illustrative purpose only, and it is to be understood that changes and variations may be made without departing from the spirit or scope of the following claims.

For example, in the above-mentioned embodiment, the passing of the setting time is displayed in a count-down manner; however, it is also practicable to display the passing of the setting time by means of an image of a gage or a sand glass, sound, or the blinking of letter or symbol at different rates.

It is also practicable for the automatic transfer control block 240 to determine the starting of automatic transfer on the basis of another transfer condition in addition to the above-mentioned transfer candidate stored status, no-operation status, and connected status. For example, if the user sleeps with regularity, a transfer condition may be added in which user's sleep time is preset and a current time is within the preset sleep time. Also, the setting time for detecting the above-mentioned no-operation status may be changed on the basis of whether the current time is within the preset sleep time or not.

It should be noted herein that the steps in the processing of the data transfer system 10 or the PC 20 include not only the processing operations which are sequentially executed in a time-dependent manner but also the processing operations which are executed concurrently or discretely (for example, parallel processing or object based processing).

Also it should be noted that the present embodiment of the invention also provides programs configured to make a computer execute each of the above-described operations of the data transfer system 10, a storage media storing these programs, programs configured to make a computer execute each of the above-described operations of the PC 20, and a storage media storing these programs.

What is claimed is:

1. A transfer apparatus to which a memory device capable of storing content data may be connected, comprising:
   a connection status detection block configured to detect a connected status in which said memory device and said transfer apparatus are interconnected;
   a storage status detection block configured to detect a transfer candidate stored status in which transfer candidate content data to be transferred to said memory device is stored in a storage media of said transfer apparatus;
   a no-operation status detection block configured to detect a no-operation status in which said transfer apparatus has not been operated by a user for longer than a predetermined period of time;
   a transfer block configured to automatically transfer said transfer candidate content data to said memory device when said connected status is detected by said connection status detection block, said transfer candidate stored status is detected by said storage status detection block, and said no-operation status is detected by said no-operation status detection block; and a time setting block configured to set the predetermined period of time to different values based on a size of the content data.

2. The transfer apparatus according to claim 1, wherein said no-operation status detection block detects said no-operation status on the basis of whether said predetermined period of time has passed without the user operating said transfer apparatus since a point of time at which said transfer apparatus was operated last by the user.

3. The transfer apparatus according to claim 2, wherein said transfer block automatically transfers said transfer candidate content data to said memory device upon confirmation of the detection of said transfer candidate stored status by said storage status detection block and said no-operation status is detected by said no-operation status detection block when said memory device is connected to said transfer apparatus.

4. The transfer apparatus according to claim 2, wherein said transfer block automatically transfers said transfer candidate content data to said memory device upon confirmation of the detection of said connected status by said connection status detection block and said no-operation status by said no-operation status detection block when said transfer candidate content data to be transferred to said memory device is stored in said storage media of said transfer apparatus.

5. The transfer apparatus according to claim 1, wherein said no-operation status detection block detects said no-operation status based on whether said predetermined period of time has passed without the user operating said transfer apparatus since a point of time at which said connected status was detected by said connection status detection block.

6. The transfer apparatus according to claim 1, wherein said no-operation status detection block detects said no-operation status based on whether said predetermined period of time has passed without the user operating said transfer apparatus since a point of time at which said transfer candidate stored status was detected by said storage status detection block.

7. The transfer apparatus according to claim 1, wherein said no-operation status detection block detects said no-operation status based on whether said predetermined period of time has passed without the user operating said transfer apparatus since said connected status was detected by said connection status detection block and said transfer candidate stored status was detected by said storage status detection block.

8. The transfer apparatus according to claim 1, wherein said no-operation status detection block has a timer for clocking a time from a predetermined origin and detects said no-operation status based on clock information provided by said timer.

9. The transfer apparatus according to claim 8, further comprising:
a display information generating block configured to generate count-down information indicative of a passing of said predetermined period of time based on said clock information provided by said timer, said count-down information being for display on a display monitor.

10. The transfer apparatus according to claim 1, wherein said no-operation status detection block detects said no-operation status when a recorded time from an origin is recorded and a difference between a current time and the recorded time exceeds said predetermined period of time.

11. The transfer apparatus according to claim 1, wherein said no-operation status detection block detects said no-operation status in which said transfer apparatus has not been operated by the user for longer than said predetermined setting period of time based on a startup of a screen saver.

12. The transfer apparatus according to claim 1, wherein said time setting block is configured to set said predetermined period of time on the basis of a user operation.

13. A transfer system comprising:
a transfer apparatus; and
a memory device capable of storing content data and being connected to said transfer apparatus;
wherein said transfer apparatus has
a connection status detection block configured to detect a connected status in which said memory device and said transfer apparatus are interconnected,
a storage status detection block configured to detect a transfer candidate stored status in which transfer candidate content data to be transferred to said memory device is stored in a storage media of said transfer apparatus,
a no-operation status detection block configured to detect a no-operation status in which said transfer apparatus has not been operated by a user for longer than a predetermined period of time,
a transfer block configured to automatically transfer said transfer candidate content data to said memory device when said connected status is detected by said connection status detection block, said transfer candidate stored status is detected by said storage status detection block, and said no-operation status is detected by said no-operation status detection block, and
a time setting block configured to set the predetermined period of time to different values based on a size of the content data,
said memory device has
a receiver configured to receive content data automatically transferred from said transfer block, and
a storage configured to store said content data.

14. The transfer system according to claim 13, wherein said no-operation status detection block detects said no-operation status based on whether said predetermined period of time has passed without the users operating said transfer apparatus since a point of time at which said transfer apparatus was operated last by the user.

15. The transfer system according to claim 14, wherein said transfer block automatically transfers said transfer candidate content data to said memory device upon confirmation of a detection of said transfer candidate stored status by said storage status detection block and said no-operation status is detected by said no-operation status detection block when said memory device is connected to said transfer apparatus.

16. The transfer system according to claim 14, wherein said transfer block automatically transfers said transfer candidate content data to said memory device upon confirmation of a detection of said connected status by said connection status detection block and said no-operation status by said no-operation status detection block when said transfer candidate content data to be transferred to said memory device is stored in said storage media of said transfer apparatus.

17. The transfer system according to claim 13, wherein said no-operation status detection block detects said no-operation status based on whether said predetermined period of time has passed without the user operating said transfer apparatus since a point of time at which said connected status was detected by said connection status detection block.

18. The transfer system according to claim 13, wherein said no-operation status detection block detects said no-operation status based on whether said predetermined period of time has passed without the users operating said transfer apparatus since a point of time at which said transfer candidate stored status was detected by said storage status detection block.

19. The transfer system according to claim 13, wherein said no-operation status detection block detects said no-operation status based on whether said predetermined period of time has passed without the users operating said transfer apparatus since said connected status was detected by said connection status detection block and said transfer candidate stored status was detected by said storage status detection block.

20. The transfer system according to claim 13, wherein said no-operation status detection block has a timer for clocking a time from a predetermined origin and detects said no-operation status based on clock information provided by said timer.

21. The transfer system according to claim 20, further comprising:
   a display information generating block configured to generate count-down information indicative of a passing of said predetermined period of time based on said clock information provided by said timer, said count-down information being for display on a display monitor.

22. The transfer system according to claim 13, wherein said no-operation status detection block detects said no-operation status when a recorded time from an origin is recorded and a difference between a current time and the recorded time exceeds said predetermined period of time.

23. The transfer system according to claim 13, wherein said no-operation status detection block detects said no-operation status in which said transfer apparatus has not been operated by the user for longer than said predetermined period of time based on a startup of a screen saver.

24. The transfer system according to claim 13, wherein said time setting block is configured to set said predetermined period of time based a user operation.

25. A program configured to make a computer function as a transfer apparatus to which a memory device capable of storing content data may be connected, comprising:
   a connection status detection block configured to detect a connected status in which said memory device and said transfer apparatus are interconnected;
   a storage status detection block configured to detect a transfer candidate stored status in which transfer candidate content data to be transferred to said memory device is stored in a storage media of said transfer apparatus;
   a no-operation status detection block configured to detect a no-operation status in which said transfer apparatus has not been operated by a user for longer than a predetermined period of time;
   a transfer block configured to automatically transfer said transfer candidate content data to said memory device when said connected status is detected by said connection status detection block, said transfer candidate stored status is detected by said storage status detection block, and said no-operation status is detected by said no-operation status detection block; and
   a time setting block configured to set the predetermined period of time to different values based on a size of the content data.

26. The program according to claim 25, wherein said program makes said no-operation status detection block detect said no-operation status based on whether said predetermined period of time has passed without the user operating said transfer apparatus since a point of time at which said transfer apparatus was operated last by the user.

27. The program according to claim 26, wherein said program makes said transfer block automatically transfer said transfer candidate content data to said memory device upon confirmation of the detection of said transfer candidate stored status by said storage status detection block and said no-operation status is detected by said no-operation status detection block when said memory device is connected to said transfer apparatus.

28. The program according to claim 26, wherein said program makes said transfer block automatically transfer said transfer candidate content data to said memory device upon confirmation of the detection of said connected status by said connection status detection block and said no-operation status by said no-operation status detection block when said transfer candidate content data to be transferred to said memory device is stored in said storage media of said transfer apparatus.

29. The program according to claim 25, wherein said program makes no-operation status detection block detect said no-operation status based on whether said predetermined period of time has passed without the user operating said transfer apparatus since a point of time at which said connected status was detected by said connection status detection block.

30. The program according to claim 25, wherein said program makes said no-operation status detection block detect said no-operation status based on whether said predetermined period of time has passed without the user operating said transfer apparatus since a point of time at which said transfer candidate stored status was detected by said storage status detection block.

31. The program according to claim 25, wherein said program makes said no-operation status detection block detect said no-operation status based on whether said predetermined period of time has passed without the user operating said transfer apparatus since said connected status was detected by said connection status detection block and said transfer candidate stored status was detected by said storage status detection block.

32. The program according to claim 25, wherein said program makes said no-operation status detection block have a timer for clocking a time from a predetermined origin and detects said no-operation status based on clock information provided by said timer.

33. The program according to claim 32, wherein said program makes the transfer apparatus further comprise:
   a display information generating block configured to generate count-down information indicative of a passing of said predetermined period of time based on said clock information provided by said timer, said count-down information being for display on a display monitor.

34. The program according to claim 25, wherein said program makes said no-operation status detection block detect said no-operation status when a recorded time from an origin is recorded and a difference between a current time and the recorded time exceeds said predetermined setting period of time.

35. The program according to claim 25, wherein said program makes said no-operation status detection block detect said no-operation status in which said transfer apparatus has not been operated by the user for longer than said predetermined period of time on the basis of startup of a screen saver.

36. The program according to claim 25, wherein said time setting block is configured to set said predetermined period of time based on a user operation.

37. A program configured to make a computer function as a transfer system, said transfer system comprising:
   a transfer apparatus; and
   a memory device capable of storing content data and being connected to said transfer apparatus;

wherein said transfer apparatus has
- a connection status detection block configured to detect a connected status in which said memory device and said transfer apparatus are interconnected,
- a storage status detection block configured to detect a transfer candidate stored status in which transfer candidate content data to be transferred to said memory device is stored in a storage media of said transfer apparatus,
- a no-operation status detection block configured to detect a no-operation status in which said transfer apparatus has not been operated by a user for longer than a predetermined period of time,
- a transfer block configured to automatically transfer said transfer candidate content data to said memory device when said connected status is detected by said connection status detection block, said transfer candidate stored status is detected by said storage status detection block, and said no-operation status is detected by said no-operation status detection block, and
- a time setting block configured to set the predetermined period of time to different values based on a size of the content data, said memory device has
- a receiver configured to receive content data automatically transferred from said transfer block, and
- a storage configured to store said content data.

38. The program according to claim 37, wherein said program makes said no-operation status detection block detect said no-operation status on the basis of whether said predetermined period of time has passed without the user operating said transfer apparatus since a point of time at which said transfer apparatus was operated last by the user.

39. The program according to claim 38, wherein said program makes said transfer block automatically transfer said transfer candidate content data to said memory device upon confirmation of the detection of said transfer candidate stored status by said storage status detection block and said no-operation status is detected by said no-operation status detection block when said memory device is connected to said transfer apparatus.

40. The program according to claim 38, wherein said program makes said transfer block automatically transfer said transfer candidate content data to said memory device upon confirmation of the detection of said connected status by said connection status detection block and said no-operation status by said no-operation status detection block when said transfer candidate content data to be transferred to said memory device is stored in said storage media of said transfer apparatus.

41. The program according to claim 37, wherein said program makes said no-operation status detection block detect said no-operation status based on whether said predetermined period of time has passed without the user operating said transfer apparatus since a point of time at which said connected status was detected by said connection status detection block.

42. The program according to claim 37, wherein said program makes said no-operation status detection block detect said no-operation status based on whether said predetermined period of time has passed without the user operating said transfer apparatus since a point of time at which said transfer candidate stored status was detected by said storage status detection block.

43. The program according to claim 37, wherein said program makes said no-operation status detection block detect said no-operation status based on whether said predetermined period of time has passed without the user operating said transfer apparatus since said connected status was detected by said connection status detection block and said transfer candidate stored status was detected by said storage status detection block.

44. The program according to claim 37, wherein said program makes said no-operation status detection block have a timer for clocking a time from a predetermined origin and detects said no-operation status based on clock information provided by said timer.

45. The program according to claim 44, wherein said program makes said transfer system further comprise:
- a display information generating block configured to generate count-down information indicative of a passing of said predetermined period of time based on said clock information provided by said timer, said count-down information being for display on a display monitor.

46. The program according to claim 37, wherein said program makes said no-operation status detection block detect said no-operation status when a recorded time from an origin is recorded and a difference between a current time and the recorded time exceeds said predetermined period of time.

47. The program according to claim 37, wherein said program makes said no-operation status detection block detect said no-operation status in which said transfer apparatus has not been operated by the user for longer than said predetermined setting period of time based on a startup of a screen saver.

48. The program according to claim 37, wherein said time setting block is configured to set said predetermined period of time on the basis of a user operation.

49. A transfer method for a transfer apparatus to which a memory device capable of storing content data may be connected, comprising the steps of:
- detecting a connected status in which said memory device and said transfer apparatus are interconnected;
- detecting a transfer candidate stored status in which transfer candidate content data to be transferred to said memory device is stored in a storage media of said transfer apparatus;
- detecting a no-operation status in which said transfer apparatus has not been operated by a user for longer than a predetermined period of time;
- automatically transferring said transfer candidate content data to said memory device when said connected status is detected in the connection status detecting step, said transfer candidate stored status is detected in the storage status detecting step, and said no-operation status is detected in the no-operation status detecting step; and
- setting the predetermined period of time to different values based on a size of the content data.

50. A transfer method for a memory device capable of storing content data and a transfer apparatus to which said memory device may be connected, comprising the steps of:
- detecting a connected status in which said memory device and said transfer apparatus are interconnected;
- detecting a transfer candidate stored status in which transfer candidate content data to be transferred to said memory device is stored in a storage media of said transfer apparatus;
- detecting a no-operation status in which said transfer apparatus has not been operated by a user for longer than a predetermined period of time;
- automatically transferring said transfer candidate content data to said memory device when said connected status is detected in the connection status detecting step, said transfer candidate stored status is detected in the storage status detecting step, and said no-operation status is detected in the no-operation status detecting step;

receiving said automatically transferred content data by said memory device;

storing said content data in said memory device; and setting the predetermined period of time to different values based on a size of the content data.

* * * * *